United States Patent [19]
Fox

[11] 3,765,319
[45] Oct. 16, 1973

[54] MACHINE FOR TREATING SOYBEANS
[75] Inventor: Wayne F. Fox, Des Moines, Iowa
[73] Assignee: Triple "F," Inc., Des Moines, Iowa
[22] Filed: May 30, 1972
[21] Appl. No.: 257,928

Related U.S. Application Data
[63] Continuation-in-part of Ser. No. 25,948, April 6, 1970.

[52] U.S. Cl............................ 99/343, 99/478, 99/493
[51] Int. Cl................................................. A23k 1/00
[58] Field of Search...................... 99/343, 331, 334, 99/353, 357, 443, 467, 477–478, 484, 493, 2

[56] References Cited
UNITED STATES PATENTS

| | | | |
|---|---|---|---|
| 2,008,860 | 7/1935 | Gardner............................ | 99/343 X |
| 2,060,408 | 11/1936 | Wood................................ | 99/467 |
| 2,401,236 | 5/1946 | Fielitz................................ | 99/353 |
| 2,509,379 | 5/1950 | Vasel................................ | 99/493 X |
| 2,915,957 | 12/1959 | Bowman............................ | 99/353 X |
| 3,336,137 | 8/1967 | Hickey.............................. | 99/353 X |
| 3,385,709 | 5/1968 | Wenger............................. | 99/2 |

Primary Examiner—Harvey C. Hornsby
Assistant Examiner—Arthur O. Henderson
Attorney—Rudolph L. Lowell

[57] ABSTRACT

The machine provides for the continuous cooking of harvested or raw untreated soybeans to remove heat labile growth inhibitors and the beany bitterness of soybeans without destroying, or rendering unavailable for digestion, some of the amino acids. The whole raw untreated soybean at ambient temperature is augered through an extruder under progressively increasing pressures so that the resultant friction and pressure develop a cooking heat in the beans of at least about 240° F. The cooked material is expelled from a die head and into the atmosphere in a jet-like fluid stream to form a resultant product which consists of loose agglomerates that may be fed directly to humans, livestock and poultry.

5 Claims, 9 Drawing Figures

PATENTED OCT 16 1973

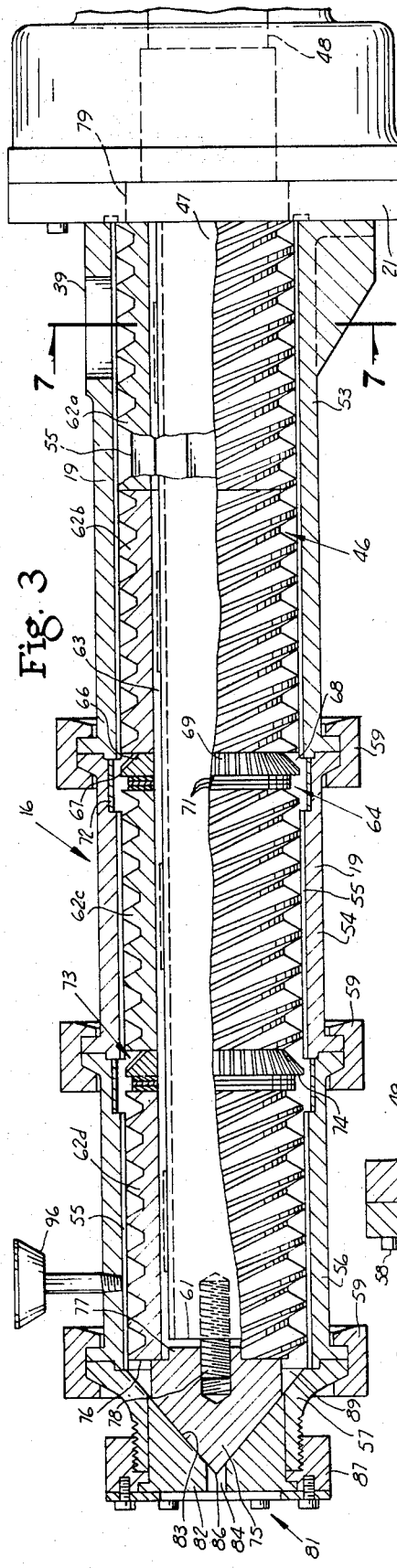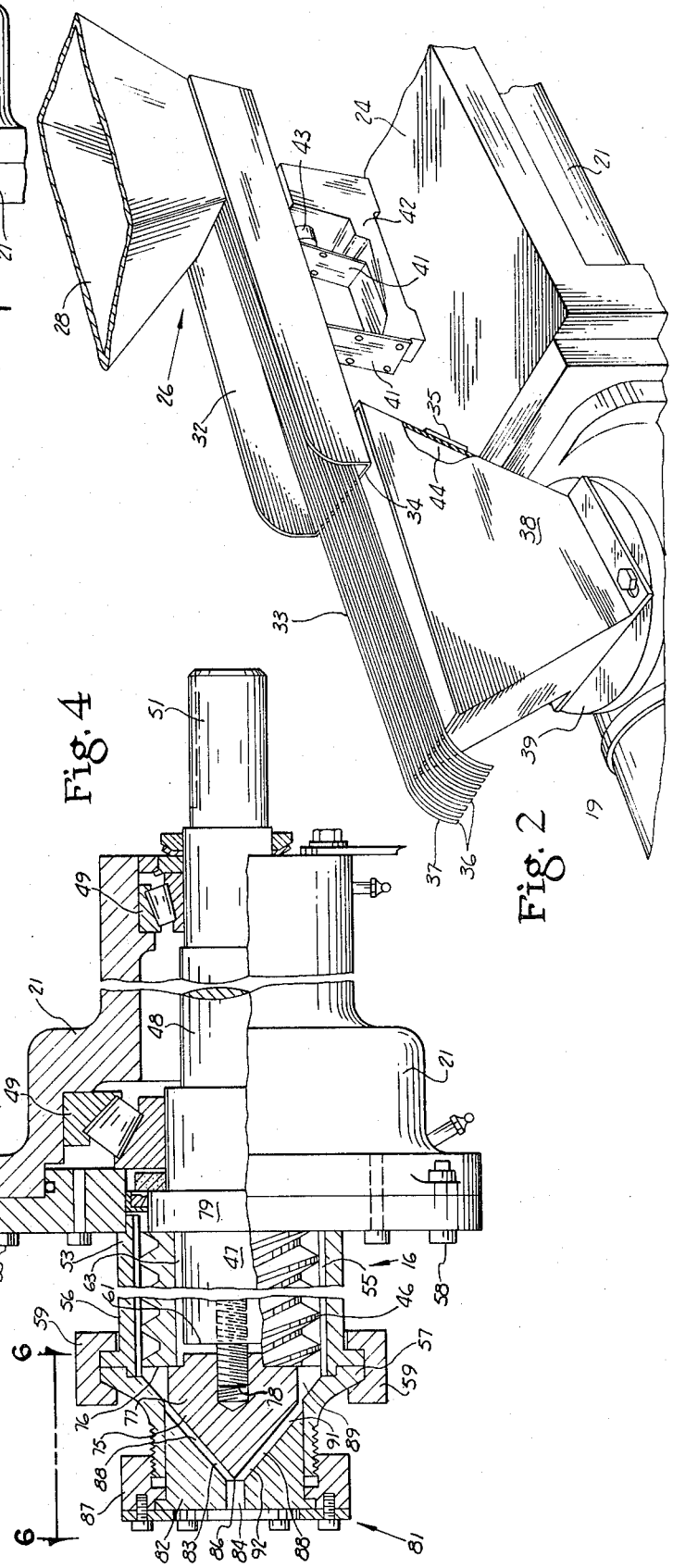

MACHINE FOR TREATING SOYBEANS

This application is a continuation-in-part of application Ser. No. 25,948, filed Apr. 6, 1970.

SUMMARY OF THE INVENTION

The invention provides for the economical cooking of soybeans directly at a feed lot to produce meals having effectively removed therefrom heat labile growth inhibitors which impede or inhibit the protein utilization activity of trypsin in the digestive systems of poultry and livestock. The machine is of a compact construction, readily transportable and adapted to be operated by an electric motor or from the power take off of a farm tractor. Since either an insufficient heating or prolonged heating of the raw untreated product reduces the feeding value of the resultant meal, meals of maximum nutritional value are obtained by an accurate control of the time-temperature relation during the cooking or treating process. With the heating temperature developed being dependent on friction and pressure, the time-temperature relation during the treating process is simply maintained by directly controlling the compressive pressure on the extruded material to automatically regulate the heating temperature and, in turn, the heating time or rate of material flow.

BRIEF DESCRIPTION OF THE DRAWINGS

FIG. 2 is an enlarged perspective detail view of the apparatus for cleaning the untreated, raw beans as they are delivered to the extruding auger;

FIG. 3 is an enlarged longitudinal sectional view of the extruding auger and die head assembly;

FIG. 4 is a foreshortened longitudinal sectional view of the extruding auger showing the die head assembly in a changed position relative to its showing in FIG. 3;

DETAILED DESCRIPTION OF THE INVENTION

Figure 1:
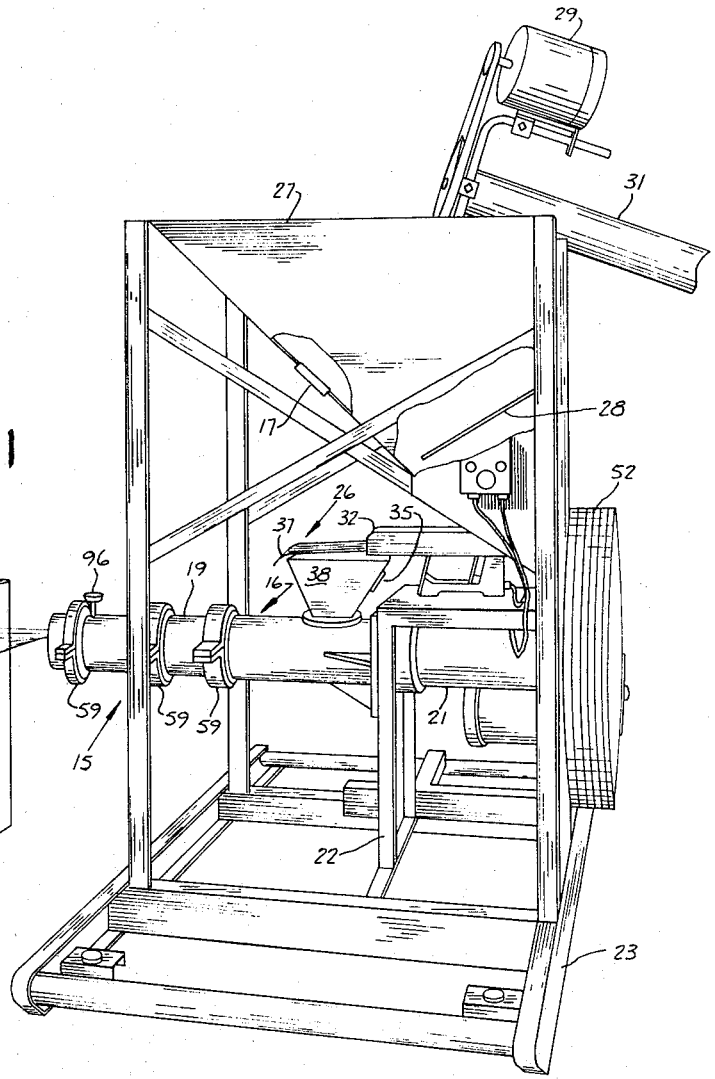
FIG. 1 is a perspective view of the extruding machine of this invention.

With reference to FIG. 1 of the drawings, the apparatus 15 of this invention is illustrated as including a longitudinally extended extruding device 16 that has an articulated housing unit 19 with a tail section 21 mounted in an upright frame 27 having a floor base 23. A horizontal platform 24 on the upright frame 22 is positioned over the housing tail section 21 and supports a bean scalping unit 26 which receives the beans to be treated or cooked from a hopper 27 provided with a discharge opening. Located above the discharge opening and secured to a wall of the hopper 27 is a baffle 28 for controlling the rate of material flow to the scalping unit 26. The hopper 27 has a switch device 17, commonly referred to as a "Bindicator" switch, which is of a pressure actuated type for controlling the loaded condition of the hopper 27. The "Bindicator" switch functions to control the operation of a drive motor 29 for a conveyor 31 of auger type that is operatively associated in a usual manner with a bean storage bin or the like (not shown). The conveyor supplies beans from the bin into the hopper 27 in direct response to the operation of the drive motor 29.

The scalping unit 26 (FIG. 2) is of the shaker or vibrating type such as the "Syntron" made by the FMC Corporation at Homer City, Pa. The scalping unit 26 has a trough 32 for receiving directly the raw untreated beans from the discharge opening of the hopper 27. The trough 32 has a refuse separating screen 33 spaced above the bottom wall 34 and comprised of a series of rods 36 extended longitudinally of the trough and formed with a delivery portion 37 projected from the front or head end of the trough. The refuse material separated by the screen 33 falls from the delivery portion 37 to the ground surface or into a suitable receiving container (not shown). The rods 36 are transversely spaced apart a distance to provide for the soybeans dropping therebetween and onto the trough bottom wall 34 and through a drop chute 38 into an inlet 39 formed in the housing 19 of the extruding device adjacent to and forwardly of the housing tail section 21.

The trough 32 is carried on a pair of upright flat spring members 41 (FIG. 2) that are secured to a mounting base 42 which, in turn, is carried on the platform 24. On flexing of the spring members 41 in a direction longitudinally of the trough 32 by an electric vibrating mechanism, indicated at 43, the beans and refuse material are vibrated and progressively moved longitudinally of the screen 33 and separared. A magnet 35 extended transversely of and carried on the rear wall 44 of the drop chute 38 collects any ferrous tramp metal that may have passed through the separating screen 33 with the soybeans to be treated.

The extruding device 16 (FIGS. 3 and 4) includes an extruding or screw auger indicated generally as 46, having a shaft member 47 with a rear end or tail section 48 suitably mounted in bearings 49 for rotation within the housing tail section 21. The shaft tail section 48 has a terminal portion 51 projected outwardly from the housing tail section 21 on which is mounted a pulley 52 (FIG. 1) for belt connection with a suitable source of power such as an engine or electric motor (not shown). In some instances it may be desired to drive the shaft 47 directly from the power take-off of a usual farm tractor (not shown).

The articulated housing 19 (FIG. 3) from the housing tail section 21 forwardly includes in order a rear section 53, an intermediate section 54, a front section 56 and a nose section 57. Each of the sections 53, 54 and 56 is formed in its inner peripheral surface with a series of axially extended circumferentially spaced flutes or grooves 55, with corresponding flutes in these sections aligned axially of the housing 19. The tail section 21 and rear section 53 are fastened together by flange bolts 58. Split clamp rings 59 connect the rear section 53, with the intermediate section 54 and the front section 56 with the nose section 57 in an axially aligned end to end relation.

The auger shaft 47 projects forwardly from the housing tail section 21 and within the housing sections 53, 54 and 56 with its front face or end surface 61 spaced rearwardly from the rear end of the nose section 57. The screw or flighting of the extruding auger 47 is comprised of a plurality of like cylindrical sleeve sections 62a–62d, inclusive, which are mounted about and keyed at 63 to the shaft 47. The flight sections 62a and 62b are located in the rear housing section 53 with the section 62a arranged rearwardly of the section 62b and open to the housing inlet 39.

Figure 5:
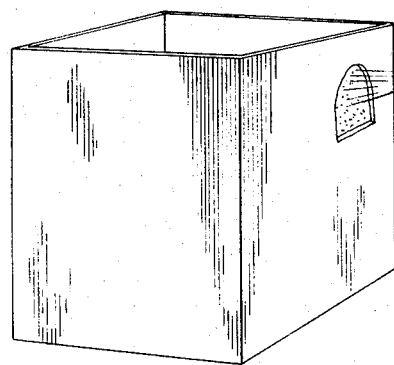
FIG. 5 is an enlarged detail perspective view of a steam lock assembly that forms part of the extruding auger.

The flight sections 62a and 62b have their inner adjacent ends in a matched abutting engagement so as to form a continuous screw or auger segment within the rear end housing section 53. Located between the adjacent ends of the flight sections 62b and 62c and mounted about the shaft 47 is a steam lock assembly 64. This assembly 64 (FIGS. 3 and 5) includes a ring member 66 having its peripheral surface formed with a front axially extended or land section 67 and a rearwardly and inwardly tapered or inclined surface 68 formed with a series of circumferentially spaced flutes or grooves 69. The ring member 66 is initially arranged against the flight section 62b (FIG. 3) with spacer washers 71 mounted on the shaft between the flight section 62c and the ring member 66. A sleeve 72 inset in the intermediate housing section 54 extends in a concentrically spaced relation about the ring member 66 with its inner peripheral surface substantially continuous with the bottom wall surfaces of the flutes 55.

A steam lock assembly 73 located between the flight sections 62c and 62d is similar in construction to the steam lock assembly 64 except for the ring member 74 thereof being of a larger diameter than the ring member 66 for a purpose to appear later. Similar numerals of reference, therefore, are used to designate like parts in the steam lock assemblies 64 and 73.

The flight sections 62a – 62d, inclusive, and the steam lock assemblies 64 and 73 (FIG. 3) are retained in a stacked relation on the auger shaft 47 by means including a cone member 75 located within the housing nose section 57. The base of the cone member 75 is engageable with the front face 76 of the screw section 62d and has a rearwardly projected boss section 77 receivable in a centered relation within the flight section 62d. The cone member 75 is secured in an axial relation with the auger shaft 47 by a stud 78 threadable within the cone member boss section 77 and front face 61 of the shaft 47. By screwing the cone member 75 on the stud 78, the flight sections 62a – 62d, inclusive, and steam lock assemblies 64 and 73 are clamped together against relative axial movememt between the cone member 75 and a thrust flange or shoulder 79 provided on the auger shaft 47 and engageable with the rear face of the flight section 62a.

The housing nose section 57 forms part of a die head assembly 81 that includes additionally a cylindrical body member 82 formed in its rear surface with a cone shaped cavity 83 (FIGS. 3 and 4) corresponding to and adapted to receive in mating engagement the cone member 75. Extended axially of the cylindrical body member 82 is a discharge bore 84 into which the apex 86 of the cone member 75 extends when the cone member 75 is in a mating flush engagement within the cavity 83 as shown in FIG. 3.

Adjustment of the cylindrical body member 82 relative to the nose section 57 and in turn relative to the cone member 75 is accomplished by means including a ring member 87 threadable about the forward end of the housing nose section 57. On rotational adjustment of the ring member 87 relative to the housing nose section 57, the cylindrical body member 82 is moved axially relative to the cone member 75 so as to vary the spacing between the adjacent complementary surfaces of the cone member 75 and cavity 83. This adjustment of the ring member 87 thus varies the transverse cross sectional area of a passage means 88 (FIG. 4) formed between the external surface of the cone member 75 and the side wall surface of the cavity 83. The passage means 88 is thus transversely expandible and contractible in direct response to a rotation of the adjustment ring 87.

A portion of the base of the cone member 75 is cut away to form with an adjacent part of the inner surface of the housing nose section 57 a circumferentially extended connecting passage means 89 that is open to the inlet end 91 of the adjustable passage means 88 and to the outlet or forward end of the auger flight section 62d. It will be appreciated that the cross sectional area of the passage means 88 progressively decreases from its inlet end 91 to its outlet end 92 which opens into the discharge bore 84 of the cylindrical body member 82.

In the use of the apparatus 15 of this invention the raw untreated soybeans are supplied into the housing inlet 39 (FIG. 3) where they are picked up by the auger screw sections 62a and 62b and moved by the coaction of the screw sections and flutes 55 forwardly toward the first or rear steam lock assembly 64. During this forward movement the beans are progressively compressed and frictionally heated and remain within the rear housing section 53 until compressed to a condition for passage through the steam lock assembly 64 between the inner peripheral surface of the sleeve 72 and land portion 67 of the ring member 66.

The bean material on being forced through the steam lock assembly 54 is then picked up by the screw section 62c and further compressed thereby concurrently with being moved forwardly to the second or forward steam lock assembly 73. The bean material is retained in the intermediate housing section 54 until it is in a condition to be squeezed or compressed between the sleeve 72 and the land section 67 of the steam lock assembly 73. The steam lock assemblies 64 and 73 constitute circumferentially extended restrictive passages providing for the application of compressive pressures on the beans by the extruding auger to frictionally heat the beans as they are conditioned for passage through the steam lock assemblies.

On passing through the steam lock assembly 73 the bean material is again additionally compressed and moved by the flight section 62d into the connecting passage means 89 and through the adjustable passage means 88 for discharge into the atmosphere through the axial bore 84 of the cylindrical body member 82.

Each housing section 53, 54 and 56 with its associated screw or flight sections 62a and 62b, 62c and 62d, respectively, constitutes or forms a compression chamber, so that the compressive pressure applied to the product material is progressively increased as the material travels through the housing 19. The product or soybean material thus travels successively through three compression chambers, which may be termed a rear compression chamber defined by the housing section 53; an intermediate compression chamber defined by the housing section 54 and a front compression chamber defined by the front housing section 56. The compressive pressure applied to the product material in the rear compression chamber is determined by the clearance relation between the ring member 66 and its associated wear sleeve 72; the pressure in the intermediate compression chamber by the clearance relation between the ring member 74 and associated wear sleeve 72 and the pressure in the front compression chamber by the adjusted position of the transversely expandible and contractible passage means 88.

Figure 7:
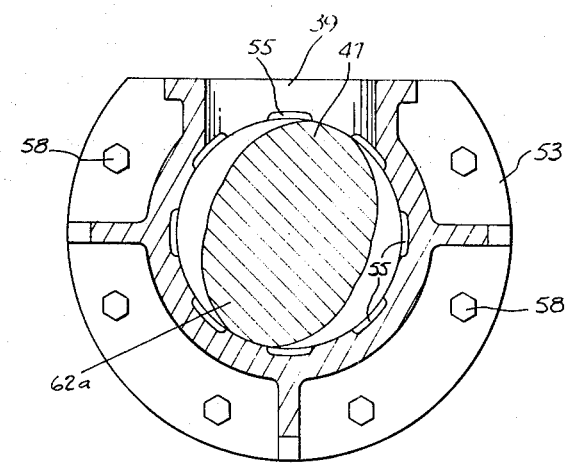
FIG. 7 is a sectional view taken on line 7—7 in FIG. 3.

As previously stated the inner peripheral surface of the housing 19 is formed with axially extended flutes or grooves 55 (FIGS. 3 and 7). As the product or soybean material travels through the housing 19, it is reduced to varying sizes by the action of the extruding auger 47. Some of the material moved forwardly by the auger 47, therefore, is retained in a housing section 53, 54 and 56 until it is of a size to be squeezed or compressed between the sleeve 72 and land section 67 of a steam lock assembly 64 or 73, or through the passage means 88. The retained material travels in the grooves 55 in a direction toward the housing inlet 39 for return into the screw 47 for additional size reducing action.

This reversed travel of some of the soybean material takes place against a counter-pressure exerted by the material being moved forwardly through the housing 19 and which counter-pressure functions as a seal to provide for the return of the rearward moving material into the screw 47. Should this seal be breached the rearward moving material has a tendency to "blow out" at the inlet 39 where the counter pressure is at atmospheric pressure. When this occurs the efficiency of the apparatus to produce a uniform quality product is temporarily reduced.

Figure 8:
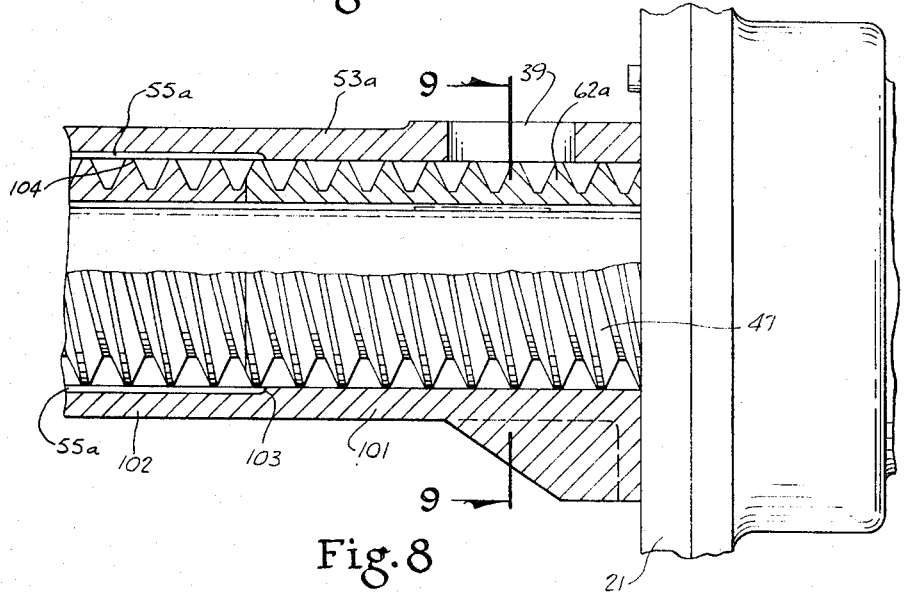
FIG. 8 is a fragmentary sectional view of the inlet portion of the extruding machine showing a modified form of construction.
Figure 9:
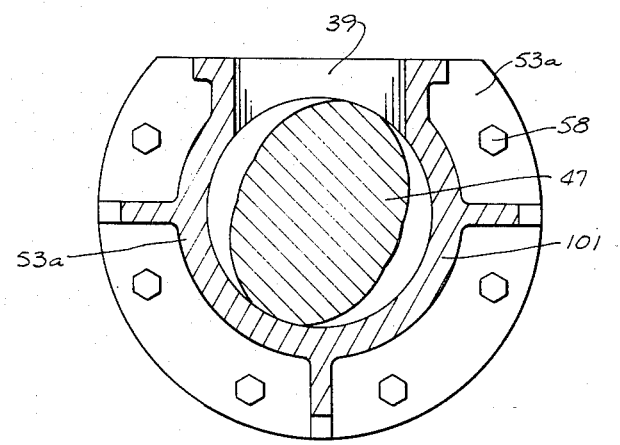
FIG. 9 is a sectional view on line 9—9 in FIG. 8.

To overcome any "blow out" of the material through the housing inlet 39 the rear housing section 53a (FIGS. 8 and 9) has a rear portion 101 formed with a continuous inner peripheral surface and a front portion 102 formed with grooves 55a so that the junction 103 of the housing section portions 101 and 102 is located forwardly or downstream from the inlet 39. The inner peripheral surface of the rear portion 101 is continuous with the surface portions 104 located between the grooves 55a and the grooves 55a are in registration with the grooves 55 in the intermediate housing section 54. Any back flow of material through the grooves 55a is thus restrained or interrupted at the rear end of the grooves 55a. The pressure of the forward moving material through the rear portion 101 of the housing section 53a, acting in opposition to the back flow material in the housing section 54, thus forms an effective material seal forwardly of the inlet 39 which blocks the grooves 55 and 55a from being open to the atmosphere at the inlet 39.

Figure 6:
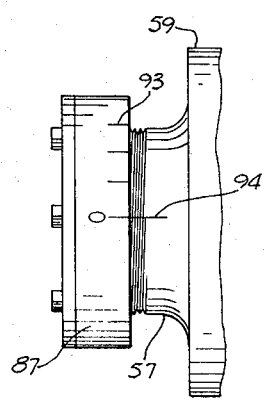
FIG. 6 is a fragmentary elevational plan view of the die head assembly as seen on line 6—6 in FIG. 4.

In one embodiment of the invention each of the screw or flight sections 62a – 62d, inclusive, has an axial length of 8 inches and an outer diameter of about 5 and one-quarter inches. The flight sections are formed with double threads or screws having a pitch of 2 inches, an addendum of five-eighths of an inch and a tooth crest formed with a 3/16 inch flat land. The clearance relation between the outer periphery of the auger screw 46 and the internal peripheral surface of the housing 19 is on the order of 0.094 inches. The steam lock assembly 64 has a clearance relation between the land section 67 on the ring member 66 and the inner peripheral surface of its associated wear sleeve 72 of about 0.125 inches, with the corresponding clearance in the steam lock assembly 73 being 0.0625 inches. In this embodiment the passage means 88 is adjustable from a completely closed position therefor, shown in FIG. 3, to a maximum spacing between the adjacent complementary surface of the cone member 75 and cavity 83 of about 0.090 inches as illustrated in FIG. 4. The adjustment ring 87 (FIG. 6) carries calibrations 93 which are movable relative to an indicator marking 94 provided on the nose section 57 so that adjustment of the passage means 88 can take place over pre-determined increment amounts.

Adjustment of the ring member 87 to control the restrictive effect of the passage 88 to the travel of the soybean product therethrough automatically controls the time-temperature relation required to properly cook the soybeans. When the beans have been treated or cooked under the optimum temperature and time requirements, the resultant material is ejected from the discharge outlet 84 in a fluid jet-like stream with the material in a frothing or bubbling condition. A temperature gauge 96 is mounted in the front compression chamber adjacent the outlet of the housing section 56 as shown in FIGS. 1 and 3. The ring 87 is adjusted until the extruded product displays frothing and bubbling characteristics at which time the temperature reading on the gauge 96 is observed. This temperature reading is then transposed to the calibrations 93 on the nose section 57 of the housing 19 in terms of the initial moisture and/or storage condition of the raw beans to be extruded. Later adjustment of the ring 87 to duplicate the previously indicated optimum bean treating conditions is thus expedited by observing only the temperature reading on the gauge 96.

It has been found that the time required for the soybeans to travel through the extruding auger 46 may vary from ten seconds to one minute with a variation in the heating or cooking temperature registered in the gauge 96 of from 240° F to 290° F and a variation of the compressive pressure within the housing section 56 of from 5 pounds per square inch to 50 poinds per square inch. Generally the higher the initial moisture content in the bean, the higher is the cooking temperature and cooking time required.

Regardless of the final cooking temperature indicated on the gauge 96 for the bean material, when such material is discharged into the atmosphere from the bore 84, its temperature substantially instantly drops to 212° F at atmospheric pressure. During this temperature and pressure reduction, the meal and oil portions of the bean material are temporarily separated. Concurrently with this temporary separation a substantial portion of the initial moisture content of the raw untreated beans is released into the atmosphere in the form of steam. Entrained within this released mositure or steam are the heat labile growth inhibitors that are contained in the raw or untreated beans. On termination of the temporary separation of the oil and meal portions of the beans, the oil portions are instantly reabsorbed by the meal portions so that the resultant material is comprised of loose agglomerates. These agglomerates, upon being cooled, may be stored in bins for later use or may be fed directly to humans, pountry and livestock.

One of the advantages of the apparatus of this invention is that the beans are handled in a raw untreated condition and capable of being properly processed under optimum temperature and time requirements regardless of their initial temperature, moisture content and/or storage condition. The beans can thus be prepared for direct feeding to stock and poultry under all weather conditions. Thus, it was found that on processing of the soybeans by the development therein of an optimum frictionally generated cooking heat, the initial moisture content is reduced by 35 to 50 per cent. Raw beans varying in initial moisture content from 8 per cent to 20 per cent, when cooked at the optimum temperature therefor, produced a bean product of nutritionally high feed value free of the toxic effect of trypsin and urease inhibitors. Thus, so long as the optimum temperature is obtained on the gauge 96 by regulation of the adjustment ring 87, the initial mositure content in the soybeans is not critical and produces no adverse effects in the resultant product for feeding purposes, since sufficient moisture, and in turn the heat labile growth inhibitors, is always released to the atmosphere.

The apparatus 15 is of a simple and compact construction and capable of being efficiently operated for long periods of use with a minimum of loss of time for maintenance and service purposes. Thus, the auger flight sections 62a–62d, inclusive, on becoming worn may be interchangeably replaced since they are of an identical construction. The wear ring or sleeves 72 of the steam lock assemblies 64 and 73 are case hardened for long service wear and can be replaced without requiring any replacement or machining of their associated housing sections 54 and 56. Likewise, as a wear sleeve 72 becomes worn at a position radially opposite the land section 67 of a ring member 66 or 74 the spacer washers 71 can be successively moved from their positions forwardly of an adjacent ring member 66 and 74 (FIGS. 3 and 4) to positions rearwardly of an associated ring member. This adjustment of a ring member 66 and 74 axially of an associated wear sleeve 72 spreads the wear on the sleeve so as to retain the required working tolerances for bean compression purposes over prolonged service periods. A frequent replacement of the sleeves 72 is thus avoided.

Importantly, since the time-temperature relation for heating or cooking the beans is automatically attained by the adjustment of the ring member 87, to indicate the optimum temperature on the gauge 96 corresponding to the condition of the raw beans to be treated, the apparatus 15 does not require a skilled operator. As a result the machine is readily adapted for use for either a grain dealer or by a farmer for direct feeding of the cooked beans to livestock and pountry.

Although the invention has been described with respect to a preferred embodiment thereof, it is not to be so limited since changes and modifications can be made therein within the intended scope of the invention as defined by the appended claims.

I claim:

1. An apparatus for treating soybeans and like full-fat oleaginous products to remove therefrom heat labile growth inhibiting materials, comprising:
   a. an auger unit including a cylindrical housing member and an extruding screw rotatably supported within said housing member,
   b. said housing member having an inlet adjacent one end thereof for receiving soybeans in a raw, untreated condition,
   c. an outlet at the opposite end of said housing,
   d. an extruding head assembly having a discharge opening,
   e. means supporting said head assembly at the opposite end of said housing member,
   f. a transversely contractible and expansible passage means in said head assembly connecting said outlet with said discharge opening,
   g. a series of circumferentially extended restrictive passage means spaced axially of said housing member to form with corresponding portions of said housing member and extruding screw a plurality of axially extended compression chambers,
   h. said circumferentially extended passage means from the inlet to the outlet of said housing member being of progressively decreasing cross sectional areas whereby the soybeans, on movement by the extruding screw through said housing, are subjected to progressively increasing compressive pressures,
   i. a heat temperature gauge means mounted on said housing to indicate the temperature of the soybeans at the outlet thereof, and
   j. means for expanding and contracting said connecting passage means, during rotation of said extruding screw, to provide a compressive pressure on the soybeans adjacent said outlet such that the temperature reading on said gauge means is not less than about 240° F.

2. An apparatus for treating soybeans and like fullfat oleaginous products to remove therefrom heat labile growth inhibiting materials, comprising:
   a. an auger unit including a cylindrical housing,
   b. an extruding screw rotatably supported within said housing,
   c. said housing having an inlet adjacent one end thereof for receiving soybeans in a raw untreated condition,
   d. an extruding head assembly mounted at the opposite end of said housing having a discharge opening,
   e. a steam lock assembly arranged between said inlet and discharge opening,
   f. an axially extended cylindrical sleeve member for said steam lock assembly mounted in the inner peripheral surface of said housing in a concentrically spaced relation about said steam lock assembly,
   g. said steam lock assembly including a ring member having a peripheral surface formed with a first axially extended section and a second section inclined inwardly of said extruding screw in a direction toward said inlet, said second section having axially extended circumferentially spaced grooves, and
   h. means for adjusting said ring member axially of said sleeve member.

3. The apparatus for treating soybeans and like fullfat oleaginous products according to claim 2 wherein:
   a. said extruding screw includes a plurality of axially aligned screw sections,
   b. a pair of said steam lock assemblies spaced axially of said screw, each steam lock assembly located at adjacent ends of certain ones of said screw sections,
   c. said ring member adjusting means including spacer members selectively movable to opposite sides of a ring member between the adjacent ends of said certain screw sections, and
   d. said sleeve member and the first section on the ring member of the steam lock assembly remote from said housing inlet being spaced a distance apart less than the corresponding space between the sleeve member and ring member first section of the other steam lock assembly.

4. The apparatus for treating soybeans according to claim 3, wherein:

a. said screw sections are of an identical construction so as to be interchangeable with each other over the full length of the extruding screw.

5. An apparatus for treating soybeans and like fullfat oleaginous products to remove therefrom heat labile growth inhibiting materials comprising:
   a. an auger unit including a cylindrical housing,
   b. an extruding screw rotatably supported within said housing,
   c. an inlet adjacent one end of said housing for receiving soybeans in a raw, untreated condition,
   d. an outlet at the opposite end of the housing,
   e. an extruding head assembly having a discharge opening,
   f. means supporting said head assembly at the opposite end of said housing member,
   g. a transversely contractible and expansible passage means in said head assembly connecting said outlet with said discharge opening,
   h. said housing having an inner peripheral surface formed with circumferentially spaced grooves extended axially thereof except for a section of said housing located adjacent to and downstream from said inlet,
   i. a series of circumferentially extended restrictive passage means spaced axially of said housing member to form with corresponding portions of said housing member and extruding screw a plurality of axially extended compression chambers,
   j. said circumferentially extended passage means from the inlet to the outlet of said housing member being of progressively decreasing transverse cross sectional areas whereby the soybeans, on movement by the extruding screw through said housing, are subjected to progressively increasing compressive pressures, and
   k. means for expanding and contracting said connecting passage means, during rotation of said extruding screw, to provide a compressive pressure on the soybeans adjacent said outlet sufficient to heat the beans to an optimum cooking temperature,
   l. said axially extended grooves providing for a reverse travel of those portions of the soybeans not admitted through a restrictive passage means and said housing section constituting a barrier against the reverse travel of any soybean portions outwardly of said housing through said inlet.

* * * * *